United States Patent [19]

Ratcliff

[11] 3,820,741

[45] June 28, 1974

[54] LATCH MECHANISM

[75] Inventor: Larry P. Ratcliff, Leaque City, Tex.

[73] Assignee: The United States of America as represented by the Administrator of the National Aeronautics and Space Administration, Washington, D.C.

[22] Filed: Oct. 26, 1972

[21] Appl. No.: 301,039

[52] U.S. Cl. .............................................. 244/1 SD
[51] Int. Cl. .............................................. B64g 1/00
[58] Field of Search .. 244/1 SS, 1 SD, 12 D, 135 A; 114/235 R, 235 A

[56] References Cited
UNITED STATES PATENTS

| | | | |
|---|---|---|---|
| 3,193,213 | 7/1965 | Eberwine | 244/1 SD |
| 3,367,606 | 2/1968 | Troxell | 244/3 |
| 3,486,716 | 12/1969 | Haberkorn et al. | 244/12 D |
| 3,608,848 | 9/1971 | Cantor et al. | 244/1 SD |

*Primary Examiner*—Duane A. Reger
*Assistant Examiner*—Jesus D. Sotelo
*Attorney, Agent, or Firm*—Russell E. Schlorff; Marvin F. Matthews; John R. Manning

[57] ABSTRACT

A novel latching mechanism has a latch member which will collapse when a member having a latching surface is passed over the latch member as it is brought into a position to engage the latch member and which will return and automatically engage the latching surface as the latching surface passes completely by the latch member. The latch member is pivotally attached to a linking member which is pivotally mounted in a housing. This arrangement has created new vector consideration, which make the release and disengagement of the latch member from the latching surface easier and more expedient than was possible with prior capture latches. The improved capture latch has made possible an improved spacecraft ring and finger mechanism which will provide substantially "fail safe" operator latching.

17 Claims, 8 Drawing Figures

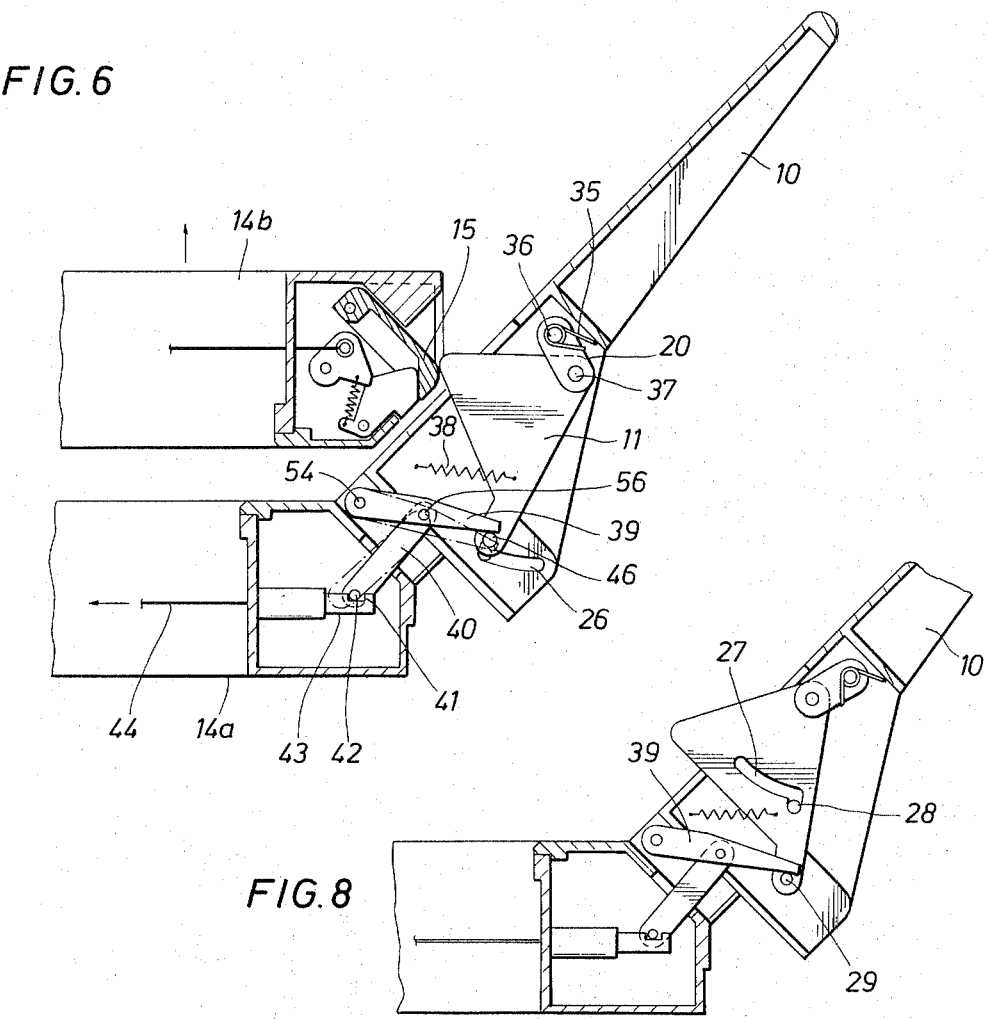
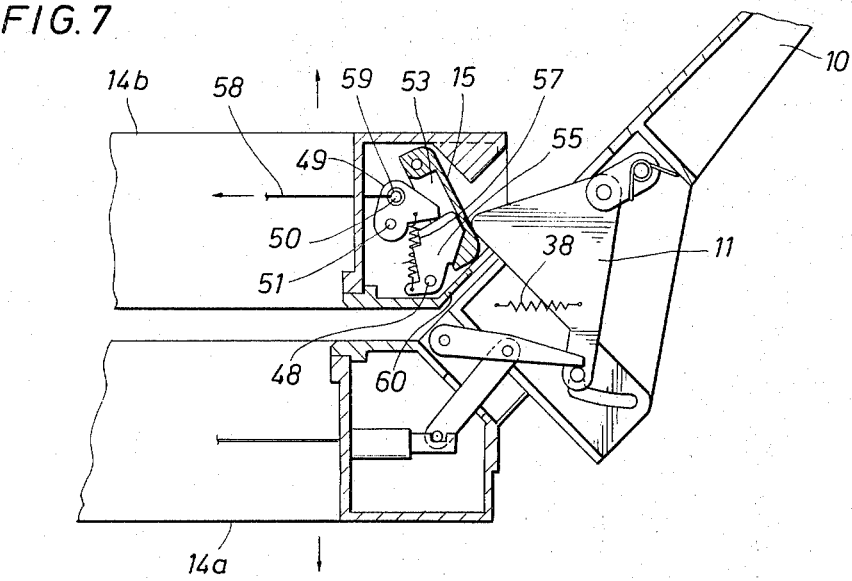

LATCH MECHANISM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The present invention relates to a latch mechanism. More particularly, it relates in its principal aspects to a capture latch which will provide a "fail-safe" mechanism for the docking and undocking of space vehicles.

The United States of America and the Union of Soviet Socialist Republics have resolved to formulate specifications and develop future spacecraft that will have compatible docking systems.

The resolve by both nations to create a compatible docking system is only a first step in achieving maximum utility and flexibility from both space programs. The requirements of a compatible docking mechanism are (1) that it operate on and in conjunction with the space vehicle, i.e., design and concept, of each country; (2) that it be of such a simple design that it can be fabricated in each country and yield a product that in fact is compatible, and (3) that it be a "fail-safe" system to the extent that man can create such a system.

A principal feature of the docking mechanism is the latching mechanism which is employed to perform the initial connection between two spacecraft and maintains such connection until the relative motion between the spacecraft is dynamically damped and the spacecraft drawn together. The docking mechanism, of course, is a portion of the vehicle, but it performs a very specialized function in aligning the two vehicles and holding that alignment until there is a structural juncture of the vehicles. The operation of the latching mechanism is the critical aspect of "fail-safe" performance.

Prior latching mechanisms have included a simple latch which rotates about a single pivot, tracing a circular path on the mating surfaces. In operation the prior capture latch would be maintained in an engaged configuration by a biasing means, such as a torsional or tension spring. As the leading surface of the mating docking mechanism contacted the capture latch, the latch was depressed until the mating surface of the mating docking mechanism came into cooperative alignment with the capture latch. The capture latch then resumed its engaged position and engaged the mating surface, thus preventing withdrawal of the mating docking mechanism. It can be appreciated that at least two substantially opposed capture latches would have to be so engaged to secure the two docking mechanisms in place together, to achieve stabilization of the two vehicles, relative to each other and allow structural connection.

Should one side of the docking mechanism not fully seat, the opposing latch is required to release or not trap the docking mechanism in order to allow another attempt at docking. The prior capture latches were not easily released under these circumstances since the load would be on the latch and the frictional component of the load opposes the releasing force direction. Thus, it is often necessary to relieve the load before the latch can be released by causing a gap between two opposing surfaces.

In a similar fashion, the release of the fully seated docking mechanisms for separation of the spacecraft is not facilitated by the prior capture latches because of the load on the latches and the resultant frictional component.

The latching mechanism of the present invention overcomes the problem of the prior capture latches in that it is easily released when there is an improper seating because of a novel linking means which has created favorable vector considerations relating to the load and the latch member. These same vector considerations also overcome the problem of releasing a fully seated docking mechanism, in that the load need not be relieved in order to release the latching mechanisms and in fact the presence of a load on the instant latch member can actually facilitate the uncoupling of the docking mechanism.

SUMMARY OF THE INVENTION

Briefly stated the latching mechanism comprises a latch member which is attached to a base or housing by a linking member that is pivotally attached to both the base and the latch member. There is also a means provided to position and direct the motion of the latch member. The latch member is adapted to engage a latching surface, particularly where there is a load on the latch member.

A central feature of the present latching mechanism is the linking member. The linking member is attached to the latch member at a point opposing the separating load force which will be applied on the latch surface engaging the latching surface. The location of the linking member relative to the separating load force is quite important to obtain all of the advantages of the present invention. It has been found that the axis of the linking member should be at an angle of greater than 1° to less than 50° to the vector of separating load force. The axis of the linking member is that taken through centerline of the two pivots therein, and the angle is that measure at the juncture of the vector of the separating force and the axis passing through the end of the linking member attached to the latch.

The reason for arranging the linking member in this manner relates to benefits from the over-center aspect of the operating of the mechanism. For example, if the angle of the linking member is 1° or less than 1° from the separating force vector, that force itself, as it is applied in the engaged mode, will tend to cause the linking member to collapse and release the latching surface. When the angle is 50° or greater, the force vector required to collapse the latch member would be approximately 90° to the vector of the separating force load which is substantially that required in the prior art.

In the spacecraft embodiment described herein, the angle employed was 16°, however, it is understood that the particular angle will depend on the desired characteristics and requirements of a particular utility. At angles between 1° and 50° the linking member will afford the advantages and features, although the degree of the advantage may be diminished as the outer limits are approached.

Another feature of the present latching mechanism is the means for positioning and directing the movement of the latch member. This conveniently is achieved by the use of a cam and cam surface. The cam can be attached to either the housing with the cam surface being located in the latch member or the cam can be attached to the latch member and the cam surface located in the housing. The cam surface is conveniently a slot or groove.

The latching mechanism of the present invention is located on a docking mechanism to be used by both the United States of America and the Union of Soviet Socialist Republics. The purpose of the latching mechanism is to hold the two space vehicles that are being docked in a stable relationship, while the actual coupling of the two vehicles is carried out by structural connection. The docking mechanism performs the additional task of aligning the two vehicles for coupling. The present latching mechanism will operate when the two vehicles are properly aligned and have approached one another in the proper alignment.

The present latching mechanism is located on an aligning finger of the docking mechanism and becomes operational when the latch member comes in contact with a latching surface on the docking mechanism on the opposing space vehicle.

The latch member remains in an extended or engaged configuration when it is not engaged, that is, the latch member is maintained in the same position by a biasing means as when engaged or unengaged. Thus, the latch member is always maintained in a posture ready to carry out its function of securing the opposing docking mechanism, when that opposing mechanism is brought into an engaging posture.

The present latch member differs from those of the prior art in that the latch member is not merely attached to a fixed pivot. The present latch member is pivotally attached to a toggle or rotational link hereinabove described as a linking member which is in turn pivotally attached to a fixed pin.

During the engagement with opposing docking mechanisms, the present latch member operates very similarly to those of the prior art. As a latching surface is brought into position for engagement with the latch member, the leading edge of the latching surface will contact the inclined back surface of the latch member and force it down into the alignment finger. As the latching surface passes by the depressed latch member, the latch member is biased back into the engaged position and thus engages the latching surface.

Similarity with the prior art ends at this point. The linking member which is pivotally connected to both the latch member and a fixed surface on the alignment finger creates a new set of vectors. For example, in the situation where the docking mechanism is not engaged on two substantially opposing sides, it will be necessary to disengage and attempt the docking procedure again. This is very simple with the present latching mechanism. Although the present latch member resists loads perpendicular to the surface of the latch member engaging the latching surface, the linking member has created new vector considerations. As the load shifts slightly from the perpendicular, for example as the misaligned spacecraft rotate or are rotated about the engaged surfaces, the linking member rotates about its two pivots to a first point. This change further accentuates the vector consideration, which is now such as to collapse the latch member to a second point and allow the latching surface to clear the tip of the latch member, thereby entirely disengaging the two vehicles.

Similarly, when it is desired to disengage the latch members, when the docking mechanism is fully engaged, the linking member is rotated only a few degrees by an operator controlled means to a point where the linking member is no longer over-center with respect to the separating load. If a separating load is continually applied, a smaller force is required from the operator controlled means to rotate the linking member which will "break" after it is over-center and cause the latch member to collapse. This procedure is carried on simultaneously for each latch member on the docking mechanism. Thus the two coupled docking mechanisms will be free to engage and separate.

Another aspect of the present invention is a collapsible latching surface which when collapsed by an operator changes the vector of the separating load force to a vector, as above described, which will dislocate the linking member and cause the latch member to collapse and allow the two docking mechanisms to be freed from one another.

Among the various advantages of the present invention are the simple design which will allow it to be fabricated in two different countries under, possibly, very different fabrication techniques to produce essentially the same device having the same mode and manner of operation. Another advantage is the adaptability of the present docking mechanism to two separately evolved spacecraft without impairment of, or interference with, the normal functioning of either spacecraft. A further advantage of the present invention is an essentially "fail-safe" latching mechansim. Further advantages are the ease of disengaging the latch members from either the engaged mode or from a misaligned docking attempt.

Another advantage of the present latches over the prior art is in the final step of engaging the latching surface, where the present latch member rotates out of the finger or housing and downward toward the latching surface, and can not bind with the latching surface, whereas the prior art latches move parallel to the latching surface and can bind therewith.

The latch mechanism of the present invention is also particularly well adapted for use in "inner" space, i.e., underwater exploration and development, since many of the same considerations such as the simple and "fail-safe" nature of the latching mechanism and the universal adaptability of the docking mechanism are important. Additionally, the present latching mechanism will be useful in such sensitive operations as air-to-air refueling of aircraft and the like.

Although the present invention in regard to the latching mechanism and associated mechanisms has been described with regard to a utilization in space for the docking of spacecraft, or in relation to two free and independently movable objects, it is to be understood that the present invention has other utilities which will be obvious to the routineer in the art, for example, in locks or in situations where the latch must be released against the force of a heavy load.

These and other advantages of the present latching mechanism and docking mechanism will be apparent from the drawings and the following detailed description of the operation of the invention.

BRIEF DESCRIPTION OF THE DRAWINGS

Reference to the drawings will further explain the invention wherein like numerals refer to like parts, and in which:

FIG. 6 is a cross-sectional elevation of the latching mechanism in a finger release mode.

FIG. 7 is a cross-sectional elevation of the latching mechanism in a ring latch release mode.

FIG. 8 is a cross-sectional elevation of an alternate latch member configuration.

DESCRIPTION OF THE PREFERRED EMBODIMENT

Figure 1:
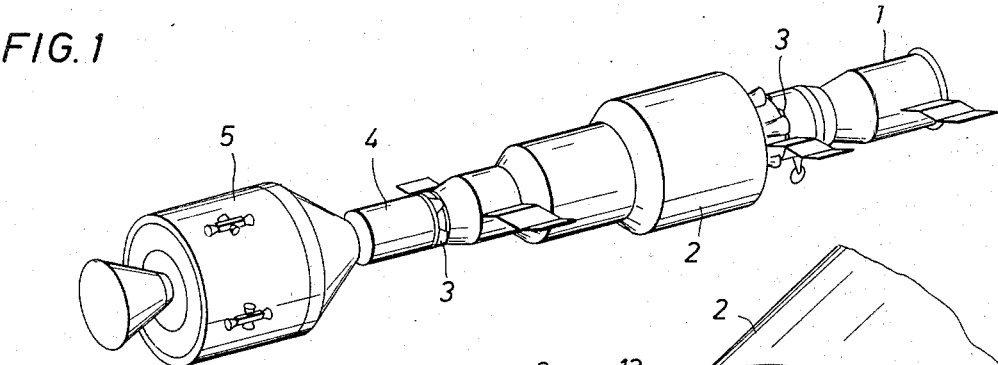
FIG. 1 is a perspective view of spacecraft configuration in a docking mission.

FIG. 1 depicts a space link-up such as that envisioned, employing the latching mechanism of the present invention. The Soyuz 1 is attached to a Salyut-type spacecraft 2 by means of a docking mechanism 3. The Salyut-type spacecraft 2 is in turn docked with a docking module 4 by means of a docking mechanism 3. The docking module 4 is in turn engaged with the Apollo command and service modules. It should be appreciated that the docking mechanism 3 is duplicated on each of the two opposed vehicles. For example, there is a docking mechanism on the docking module 4 engaged with a duplicate docking mechanism mounted on the Salyut-type spacecraft 2.

Figure 2:
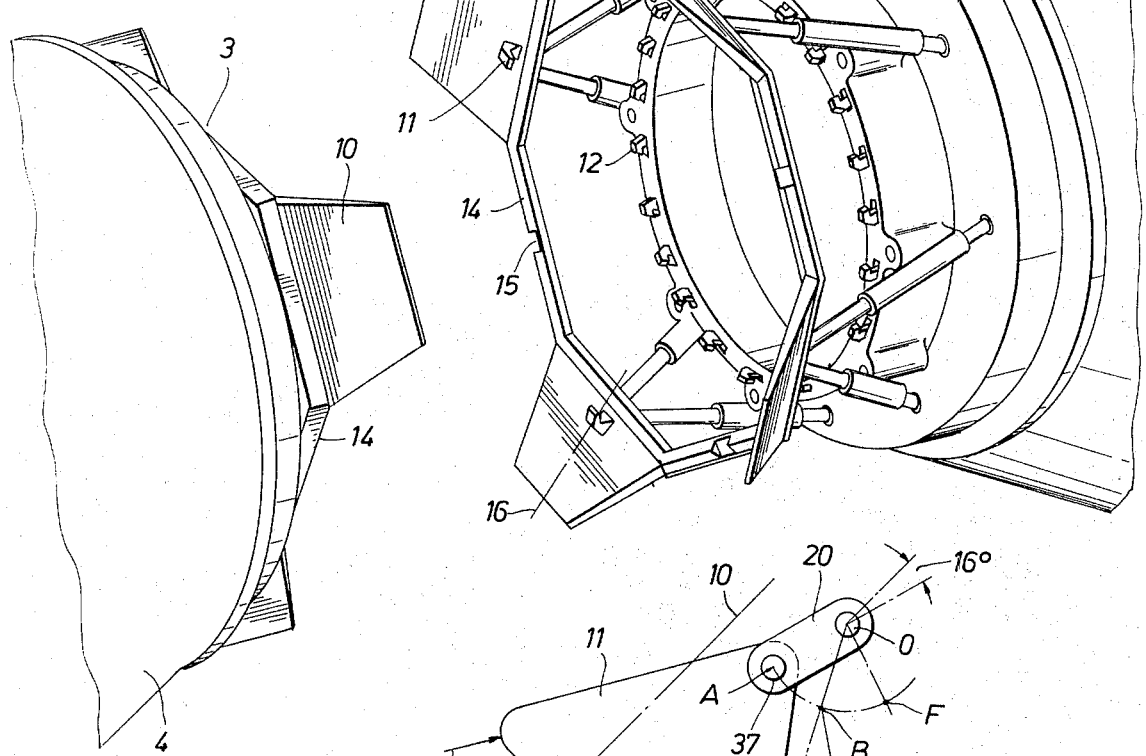
FIG. 2 is a perspective view of the two docking mechanisms in a docking attitude.

Referring to FIG. 2, this concept of duplication of the docking mechanism on both vehicles can be more clearly seen. The Salyut-type spacecraft 2 is located on the right with the docking mechanism attached thereto, and to the left aligned in an engaging posture is the docking module 4 with its corresponding or duplicate docking mechanism 3 rotated one-eighth of a turn from the position of the docking mechanism on the Salyut. The docking mechanism is composed of a ring 14 which is an octagonal configuration. Mounted at alternating sites on the ring are alignment fingers 10, so that there are four such fingers 10 on the ring 14. Located on each finger is the latch member 11 which is located approximately on a center line 16 through the finger. Located on each of the other four portions of the ring at approximately the center of each of these portions of the ring is a latching surface 15. Latching surface 15 is so situated as to be in alignment with latch member 11 when the two docking mechanisms 3 are brought into engaged position. During engagement, the fingers 10 of the docking mechanism on the docking module 4 will be seated between the fingers 10 on the docking mechanism of the Salyut-type spacecraft 2. There may be eight engagements of latch members 11 with latching surfaces 15, although only two substantially opposed matings are necessary in order to secure the two docking mechanisms together. The docking mechanism 3 is attached to the spacecraft by means of attenuators 13. The attenuators 13 shown here are hydraulic type. However, electromechanical attenuators or other types may be employed, and their selection is not part of this invention. After the docking mechanism 3 on the docking module 4 has engaged the docking mechanism 3 on the Salyut-type spacecraft, the attenuators are activated by means (not shown) to bring the two spacecraft structures together, at which time the structural latches 12 are engaged. Thus it can be seen that the purpose of the docking mechanism it to make the initial contact between the two spacecraft, to secure the two spacecraft and to maintain this initial connection until the relative motion between the spacecraft is dynamically dampened, and to provide a posture in which the spacecraft can be structurally joined together.

FIGS. 4–7 show four modes of the present latching mechanism and docking mechanism. These figures will be described not only in regard to the function occurring in FIGS. 4–7 but with regard to FIG. 3, which is a diagrammatic figure having vectors and particular points of location which occur in the various modes. In each of these drawings the fingers 10 are at a 45° angle to the ring 14 and the vector of the separating force load is parallel thereto. The linking member 20 is at a 16° angle to the vector of the separating force and to the surface of finger 10. The angular relationships are depicted in diagrammatic representation in FIG. 3.

Figure 3:
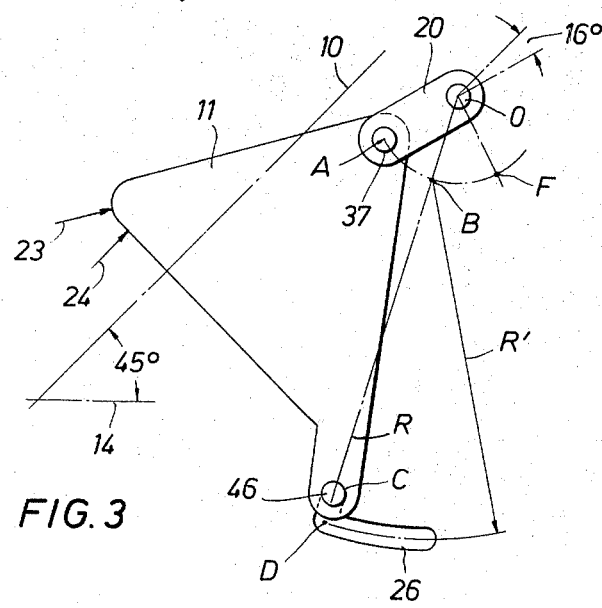
FIG. 3 is a diagrammatic of the latch member.
Figure 4:
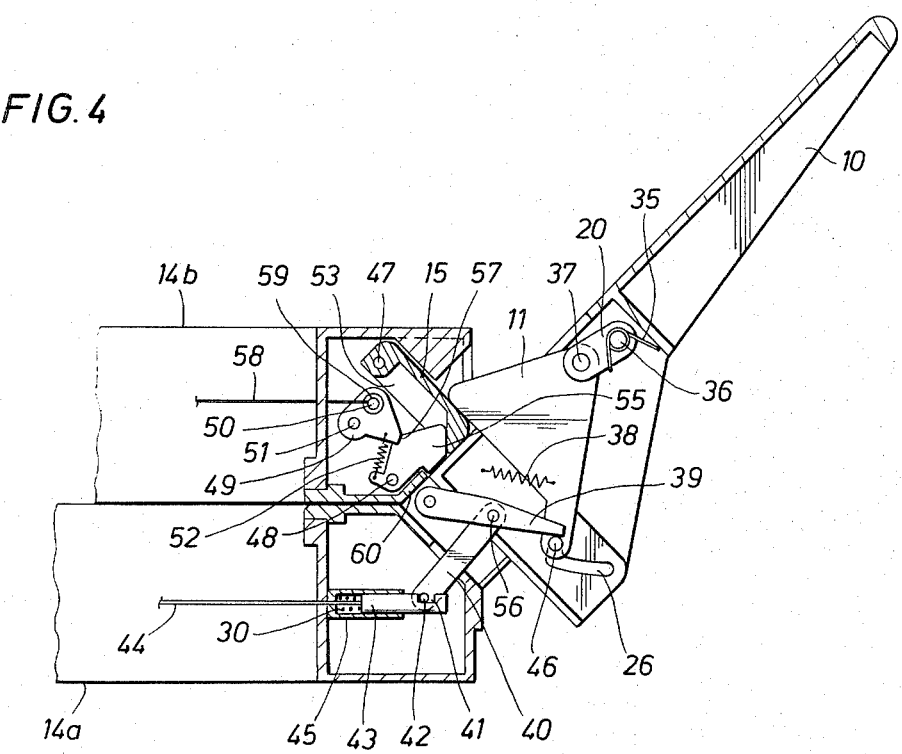
FIG. 4 is a cross-sectional elevation of the latching mechanism in the engaged mode.

In FIG. 4 the latch member 11 is in the engaged mode engaging latching surface 15. As described before with regard to FIG. 3, the finger 10 is mounted on ring 14. Although not shown here, finger 10 may be hingedly mounted in order to be folded inwardly on the ring when not in use or, for example, during launch in order to fit inside of the launch shroud. In the engaged mode, the latch member is fully extended from the finger 10 wherein it is mounted. The latch member 11 is mounted by means of a rotational link 20 pivotally attached to latch member 11 by pin 37. The linking member is in turn pivotally mounted on pin 36, which is affixed to the finger 10. Torsional spring 35 is biased against a portion of finger 10 and tends to urge the linking member 20 and the latch member 11 outward from the finger 10. Also aiding in maintaining the engaged position of latch member 11 is a tension spring 38 which is attached to finger 10 and to the latch member 11. Cam 46 is mounted at the lower end of latch member 11, said cam being situated to move along or through slot 26.

Although the latch member is described as being mounted in finger 10, it should be understood that the latch member and its related components can be mounted in any suitable housing or base, adapted for the task or utility to which it is to be applied.

The latch member 11 may be activated, that is, disengaged, by lever 39 pivotally mounted in finger 10 on pin 54. Lever 39 is actuated by arm 40 which is seated in notch 41 in bar 30 by means of a pin 42. Bar 43 is held in place by holder 45 and attached to cable 44, by which it is operated. The release is actuated by movement of cable 44 in the direction of the arrow and will be described in greater detail with regard to FIG. 7.

Referring now to FIG. 3, in the engaged position or mode of FIG. 4 cam 46 is located at point C and pin 37 is located at point A of FIG. 3.

Referring again to FIG. 4, a second ring 14b is seated against the first ring 14a on which finger 10 is mounted. The latch member 11 is seated against latching surface 15. The two surfaces which contact are substantially parallel. This is important since any separating force between the two fully engaged rings will tend to apply a force to latch member 11 along vector 24 (FIG. 3). Any force along vector 24 will tend to hold latch member 11 in the engaged position. The leading edge 60 of ring 14b is seated against the surface of ring 14a. The latching surface 15 is held in place by latching surface lock member 55 which is pivotally mounted on pin 48 in ring 14b. Latching surface lock member 55 is a portion of a mechanism which allows the latching surface 15 to be the means of release of the two engaged vehicles. The latching surface lock member 55 is itself held in place by release member 49, which is fitted into shoulder 57 located on latching surface lock member 55. The two members 49 and 55 are partially held in this configuration by tension spring 52. In addition to the tension spring 52, any force applied against latching surface 15 will tend to force latching surface lock member 55 against release member 49, thus seating release member 49 more securely into shoulder 57.

Release member 49 is part of a mechanism designed to allow the two rings to be disengaged by release of the latching surface mechanism. The release member 49 is pivotally mounted in ring 14b on pin 51. Cable 58 is attached to release member 49 by means of a bushing 59 which is fixedly attached to cable 58, said bushing being seated on a shaft 50 mounted on release member 49. Also in conjunction with this release mechanism, latching surface 15 is equipped with a chamber 53 into which latching surface lock member 55 moves during the release operation. In addition, latching surface 15 is pivotally attached in ring 14b. The release mechanism is actuated by movement of cable 58 in the direction indicated by the arrow. Operation of this mechanism will be described in detail with regard to FIG. 7.

Figure 5:
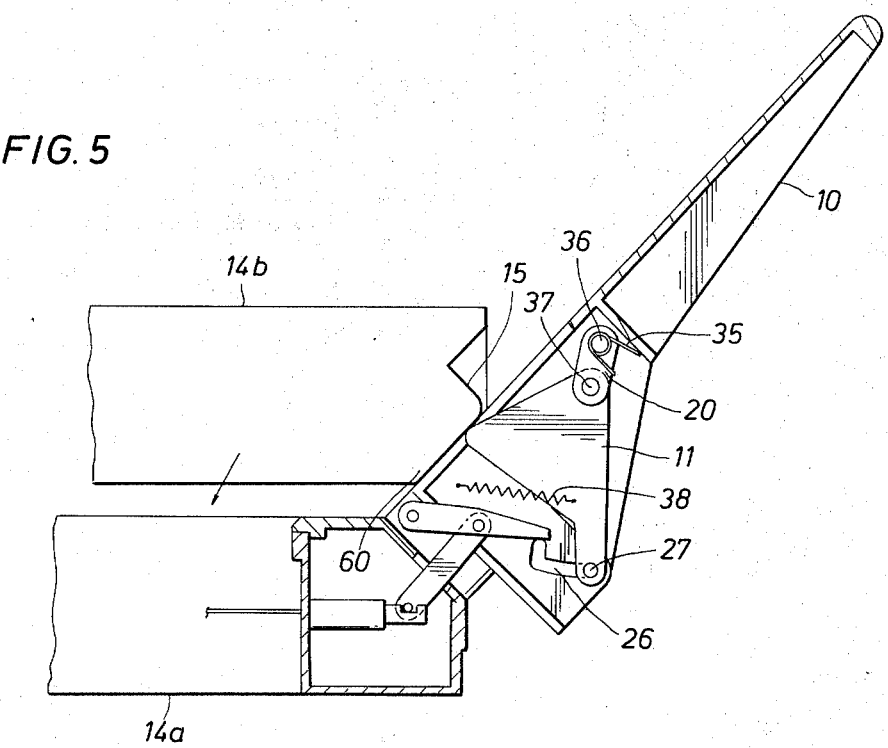
FIG. 5 is a cross-sectional elevation of the latching mechanism in the latching mode.

FIG. 5 shows rings 14a and 14b in the latching mode. As the leading edge 60 of ring 14b initially contacts latch member 11, the latch member is depressed.

Referring now to FIG. 3 to understand the operation of the mode as shown in FIG. 3, as the latch member 11 is depressed, the point A of linking member 20 and latch member 11 rotates about stationary point O. The cam 46 moves away from point C, constrained by slot 26. When point A reaches point B, point C simultaneously reaches point D, where the slot abruptly changes to a circular path with point B as center. The latch member 11 then begins to rotate about point AB with linking member 20 remaining stationary, until the ring 14b has cleared the tip of the latch member 11. The circular portion of guide slot 26 is the circumference of an arc having a radius R' which has as its center point B, and the notch portion of slot 26 is along the radius of a circle at center point B.

As latching surface 15 passes by the end of latch member 11, torsional spring 35 has been compressed by the depression of latch member 11, and tension spring 38 has been further expanded. The restoring moment of these two springs forces the latch member 11 into the engaged or closed position. This action can be further understood from FIG. 3 where cam 46 moves back to point D with the linking member 20 remaining stationary. The cam 46 then moves back to point C as linking member 20 rotates back to its original position A. This final rotational movement reduces the clearance between the latch member and the latching surface, since the latch member moves toward the latching surface.

In this position, the latch member resists the ring's movement in an "over center" type action, and the load in the ring, if parallel to the finger 10, adds to the restoring or latching moment in the linking member 20.

It should be noted that FIG. 5 also depicts the alternate embodiment, in which there is no release means provided for the latching surface 15. Similarly other embodiments (not shown) may not have a release means for the latch member since release can be affected by means of the ring latch release mode described in FIG. 7.

FIG. 6 depicts the finger latch release mode. This mode is actuated by drawing cable 44 in the direction of the arrow, i.e., to the left of the drawing, which moves bar 43 to the left, causing the pin 42 to come against the side of the notch 41, thus drawing arm 40 to the left also. In drawing arm 40 to the left, lever 39 pivots about pin 54 and forces cam 46 down.

Referring now to FIG. 3 for analysis of the movement of the latch member 11 in the finger latch release mode, cam 46 is moved from point C to point D. This movement just described is shown by the phantom outlines of arm 40, lever 39 and cam 46 in FIG. 6. By forcing cam 46 from point C to point D, the linking member is no longer over center with respect to the separating load, i.e., the load tending to cause rings 14a and 14b to separate. If the separating load is continually applied after the linking member 20 is no longer over center, the cam 46 will not follow guide slot 26 but will continue back to point C. Simultaneously, the linking member 20 will rotate past point B onto point F, at which point the latch is sufficiently collapsed to allow the rings to separate.

As ring 14b clears the tip of latch member 11, linking member 20 is caused to rotate about point O of FIG. 3 from its position at point F to point B by springs 35 and 38 shown in FIGS. 4–7. Simultaneously, cam 46 moves from point C to point D. Springs 35 and 38 continue to force latch member 11 into the engaged or closed position. Thus linking member 20 rotates past point B to point A, and cam 46 moves from point D back to point C.

FIG. 7 shows the ring latch release mode wherein cable 58 is moved in the direction of the arrow, i.e., to the left of the drawing, whereupon bushing 59 pulls against shaft 50, causing release member 49 to rotate about pin 51, which removes release member 49 from shoulder 57 in latching surface lock member 55. As a separating force is applied to the two rings, this causes mating surface lock member 55 to collapse into chamber 53 located in the underside of latching surface 15. This causes latching surface 15 to drop and change its position relative to latch member 11. In so doing, it can be seen from FIG. 7 and FIG. 3 that the vector of the separating force now being applied to latch member 11 is that of vector 23 (FIG. 3) which will cause the latch member to collapse. As the vector force is applied along line 23, the point A of linking member 20 rotates about stationary point O. The guide pin C moves away from point B along the path determined by guide slot 26. When point A reaches point B, point C simultaneously reaches point D where the slot 26 changes to a circular path with B as the center. The latch member then begins to rotate about point AB, with the rotational link 20 remaining stationary until the leading edge of the mating surface has cleared the latch member 11, at which time the latch member will resume its engaged or closed position as described above for FIG. 5.

Referring again to FIG. 7, as ring 14b clears the latch member 11, tension spring 52 which is in a further distended configuration returns to its original shape, causing both release member 49 and latching surface lock member 55 to rotate to their closed or engaged positions with release member 49 seated in shoulder 57 of latching surface lock member 55.

Simultaneously with rotation of latching surface lock member 55 about pin 48 to its closed position, latching surface 15 is forced back into its closed or engaged position by rotation of latching surface lock member 55 about pin 58.

FIG. 8 shows an embodiment employing a reversal of parts in that a cam 28 is fixedly mounted in the finger 10 and a guide slot 27 is located in the latch member 11, so that the slot 27 moves along the cam 28 positioning and directing the movement of the latch member in the same manner as heretofore described. In this embodiment the lever 39 rests on element 29 protruding from latch member 11.

Conventional and obvious substitutions, modifications and reversal of parts, as is common, is contemplated to be within the scope of the present invention and is so claimed.

What is claimed is:

1. A latching mechanism comprising a housing, a generally elongated latch member, means for resiliently projecting a portion of the latch member from said housing, a rotational link having one end pivotally attached to one end of the latch member and the other end pivotally attached to the housing, and means for rotatively guiding the other end of said latch member relative to said housing.

2. The latching mechanism according to claim 1, wherein said means rotatively guiding said latch member relative to said housing comprises a slot and pin arrangement.

3. The latching member according to claim 2, wherein the slot has a portion which prohibits movement of the latch member along the slot prior to pivotal movement of the rotational link.

4. The latching mechanism according to claim 3, wherein the slot is in the housing and is of arcuate shape and there is an element extending from a corner of the latch member from which the pin projects toward the slot.

5. The latching mechanism according to claim 1 wherein the angle between the rotational link and the separation vector is between 1° and 50°.

6. The latching mechanism according to claim 1 wherein said latch member comprises a triangle-like element.

7. The latching mechanism according to claim 1 comprising a means to rotate said latch member and said linking member about the pivotal attachments.

8. The latching mechanism according to claim 7 wherein said means to rotate comprises a lever pivotally attached at one end to said housing and the other end of said lever resting on an element protruding from said triangle-like element and means to move said lever against the protruding element in order to move said triangle-like element.

9. A docking mechanism for engaging a latching surface, comprising
a ring-like frame member having a plurality of finger portions extending therefrom,
a corresponding plurality of latch members each located in and slidably interconnected with one of said finger portions for engaging said latching surface, and
a corresponding plurality of linking members each pivotally connected at one end with one of said finger portions of said frame member and at the other end with the associated latch member.

10. The docking mechanism according to claim 9 wherein said latch members are slidably interconnected with one of said finger portions by a corresponding plurality of cams located in slots.

11. The docking mechanism according to claim 10 wherein said latch members are independently rotatable about two spaced apart axes.

12. The docking mechanism according to claim 11 wherein said linking members are each connected at one of said axes with an associated latch member.

13. The docking mechanism according to claim 12 wherein each of said latch members have a foot-like member extending therefrom and one of said cams is each attached to an associated foot-like member.

14. The docking mechanism according to claim 13 comprising a corresponding plurality of means to rotate each of said associated latch members and linking members about the pivotal attachments.

15. The docking mechanism according to claim 14 wherein said means to rotate comprise a plurality of levers each pivotally connected at one end to an associated finger portion and the other end of each of said levers resting on a corresponding plurality of elements protruding from an associated latch member and a corresponding plurality of means to move each of said levers against an associated protruding element in order to move an associated latch member.

16. The docking mechanism according to claim 13 wherein said latch members comprise a triangle-like element having each of said associated linking members attached at an angle thereof and said foot-like members extend from an angle thereof.

17. The docking mechanism according to claim 16 wherein an angle of each of said triangle-like elements projects from an associated finger portion.

* * * * *